United States Patent
Nepsund et al.

[11] Patent Number: 5,474,337
[45] Date of Patent: Dec. 12, 1995

[54] JOINT AND SEAL SYSTEM FOR AIR TRANSFER TUBES

[75] Inventors: Larry R. Nepsund, Savage; John D. Sandkamp, Minnetonka, both of Minn.

[73] Assignee: Donaldson Company, Inc., Minneapolis, Minn.

[21] Appl. No.: 406,645

[22] Filed: Mar. 20, 1995

Related U.S. Application Data

[63] Continuation of Ser. No. 126,264, Sep. 24, 1993, abandoned.
[51] Int. Cl.⁶ ................................................. F16L 17/02
[52] U.S. Cl. ....................... 285/345; 285/94; 285/423; 285/910
[58] Field of Search ............................. 285/8, 345, 177, 285/7, 94, 231, 339, 910, 423

[56] References Cited

U.S. PATENT DOCUMENTS

| | | |
|---|---|---|
| 237,324 | 2/1881 | Reynolds . |
| 981,705 | 1/1911 | Spencer . |
| 1,808,066 | 6/1931 | Plummer . |
| 1,817,774 | 8/1931 | Sipe . |
| 1,830,782 | 11/1931 | Burnish et al. . |
| 2,269,664 | 1/1942 | Hallerberg . |
| 2,529,098 | 11/1950 | Noll ................................. 285/231 X |
| 2,562,359 | 7/1951 | Iredell ............................. 285/231 X |
| 2,688,499 | 9/1954 | Hanson ................................. 285/8 |
| 2,699,357 | 1/1955 | Roth ................................. 285/8 X |
| 2,985,469 | 5/1961 | Bowman, Jr. . |
| 3,078,650 | 2/1963 | Anderson et al. . |
| 3,080,183 | 3/1963 | Luertzing et al. . |
| 3,148,895 | 9/1964 | Jasper et al. ............................. 285/7 |
| 3,165,324 | 1/1965 | Zopfi . |
| 3,217,400 | 11/1965 | Illesy et al. . |
| 3,432,189 | 3/1969 | Buller . |
| 3,507,505 | 4/1970 | Muhlner et al. ...................... 285/345 X |
| 3,592,481 | 7/1971 | Jeffery et al. . |
| 3,592,491 | 7/1971 | Glover ................................. 265/345 X |
| 3,672,130 | 6/1972 | Sullivan et al. . |
| 3,684,317 | 8/1972 | Kazienko et al. . |
| 3,724,878 | 4/1973 | Ford . |
| 3,726,574 | 4/1973 | Tuffias et al. . |
| 3,794,360 | 2/1974 | Bachle et al. . |
| 3,865,413 | 2/1975 | Mizusawa et al. . |
| 3,891,224 | 6/1975 | Ditcher . |
| 3,913,928 | 10/1975 | Yamaguchi . |
| 3,964,773 | 6/1976 | Stade et al. . |
| 3,998,478 | 12/1976 | Zopfi . |
| 4,128,251 | 12/1978 | Gaither et al. . |
| 4,133,563 | 1/1979 | Yamazaki . |
| 4,143,884 | 3/1979 | Nicholas et al. . |
| 4,159,197 | 6/1979 | Schuler et al. . |
| 4,211,543 | 7/1980 | Tokar et al. . |
| 4,226,446 | 10/1980 | Burrington . |
| 4,227,898 | 10/1980 | Kamekawa et al. . |
| 4,235,611 | 11/1980 | Brownell . |
| 4,275,909 | 6/1981 | Yoshizawa et al. . |
| 4,315,630 | 2/1982 | French et al. .................. 285/345 X |
| 4,350,509 | 9/1982 | Alseth et al. . |
| 4,362,323 | 12/1982 | Lodder et al. .................. 285/94 X |
| 4,378,945 | 4/1983 | Trautman . |
| 4,379,559 | 4/1983 | Bohman . |
| 4,453,746 | 6/1984 | Keenan . |
| 4,488,889 | 12/1984 | McCarroll . |
| 4,491,460 | 1/1985 | Tokar . |
| 4,542,922 | 9/1985 | Grossauer . |

(List continued on next page.)

FOREIGN PATENT DOCUMENTS

| | | |
|---|---|---|
| 806525 | 12/1936 | France . |
| 827353 | 2/1960 | United Kingdom . |
| WO93/06403 | 4/1993 | WIPO . |

Primary Examiner—Dave W. Arola
Attorney, Agent, or Firm—Merchant, Gould Smith, Edell, Welter & Schmidt

[57] ABSTRACT

Assembly is described for providing a radial seal between two air conduit members. The assembly generally comprises a first conduit member having seal retainer thereon and, second conduit member having a tubular section which is inserted into the seal retainer, during formation of the radial seal. The seal retainer comprises a retainer trough having a removable and replaceable seal ring positioned therein.

12 Claims, 5 Drawing Sheets

U.S. PATENT DOCUMENTS

| | | |
|---|---|---|
| 4,565,381 | 1/1986 | Joelson . |
| 4,609,465 | 9/1986 | Miller . |
| 4,664,424 | 5/1987 | Smith . |
| 4,720,292 | 1/1988 | Engel et al. . |
| 4,723,796 | 2/1988 | Nattel . |
| 4,754,994 | 7/1988 | Melzer et al. . |
| 4,763,932 | 8/1988 | Matz et al. . |
| 4,856,826 | 8/1989 | Engel et al. . |
| 4,974,881 | 12/1990 | Engel et al. . |
| 5,037,144 | 8/1991 | Peting et al. .......................... 285/94 X |
| 5,064,458 | 11/1991 | Machado . |
| 5,071,456 | 12/1991 | Binder et al. . |
| 5,129,685 | 7/1992 | Engel . |
| 5,137,308 | 8/1992 | Engel et al. . |
| 5,213,339 | 5/1993 | Walworth . |

JOINT AND SEAL SYSTEM FOR AIR TRANSFER TUBES

This is a continuation of application Ser. No. 08/126,264, filed Sep. 24, 1993, now abandoned.

FIELD OF THE INVENTION

The present invention relates to air transfer conduits or tubes. The invention particularly concerns formation of a joint between two air transfer tubes and the provision of a seal in association with the joint, to inhibit leakage. The particular arrangement depicted is a construction for providing joints between an air filter housing and a clean air duct or intake duct of a ventilation system for a vehicle such as the cab of an agricultural implement. The arrangement may also, for example, be used as part of an air intake system for an engine.

BACKGROUND OF THE INVENTION

A variety of systems and arrangements for providing a joint connecting two conduits are known. The arrangements disclosed in U.S. Pat. Nos. 981,705; 1,830,782; 1,817,744; 2,269,684; 3,165,324; 4,856,826; 4,974,881; 5,129,685; and 5,137,308, incorporated herein by reference, reflect some of the variety of arrangements known.

In general, it would be desirable to provide arrangements which avoid the utilization of clamps, bolts or similar structures, to maintain the connection. Advantages which would result from this include: potential cost savings from the avoidance of a multiplicity of parts; ease of manufacture; and, ease of assembly. Many conventional arrangements have not avoided clamps at, or in association with, a junction between conduits. Where clamps have sometimes been avoided, generally a threaded connector, snap fit connector, molded seal or similar construction has been involved. In general while each system has its advantages and disadvantages, to date none has been fully acceptable. What is desired is a system which can be readily manufactured, can be easily installed, and which lends itself toward convenient maintenance and, if necessary, refurbishment or replacement.

SUMMARY OF THE INVENTION

According to the present invention an assembly is disclosed for providing a radial seal between two air conduit sections. The assembly generally comprises a first conduit member and a second conduit member. The first conduit member includes a seal retainer thereon. As described hereinbelow, the seal retainer generally includes a retainer trough with a removable and replaceable seal ring nested therein. The seal ring includes an inner surface defining a central aperture. Preferably the seal ring comprises a compressible elastomeric material. The seal ring is configured to have at least first, second and third outside walls, as well as the inner surface. The retainer trough has at least three sidewalls configured and positioned to extend along the seal retainer first, second and third outside walls.

The second conduit member has a tubular section constructed and arranged for insertion through the seal ring central aperture, when the seal ring is nested within the retainer trough, to form a radial seal with a seal ring inner surface. In preferred embodiments the seal ring inner surface has a decreasing diameter along a direction of insertion of the second conduit member therethrough, during formation of the radial seal. Thus, a tighter seal is formed along a portion of the second conduit member tubular section which is further inserted into the seal retainer, i.e. through the retainer trough.

In a preferred embodiment the seal ring has first and second end walls; and, the seal ring inner surface is stepped, and decreases in diameter, from the first end wall to the second end wall.

Also in one preferred embodiment the seal ring has an outer side wall opposite the seal ring inner surface; the outer side wall having a frusto-conical configuration and increasing outside diameter in extension from the first end wall to the second end wall. That is, the frustoconical configuration increases in diameter along a direction of extension from the second conduit member toward the first conduit member, during assembly. The frusto-conical configuration preferably provides for an outer side wall having a smooth surface, without lips, ribs, engaging fingers and the like thereon; i.e. without any features which mechanically engage any portion of the retainer trough.

In preferred embodiments the first end wall of the seal ring is substantially parallel to the second end wall of the seal ring.

In an alternate embodiment the seal ring inner surface has a beveled section defining first and second conical portions with an outer ridge positioned therebetween. The first conical portion preferably has a decreasing inside diameter in extension along a direction from the first end wall to the ridge; and, the second conical section preferably has a decreasing inside diameter along a direction of extension from the second end wall to the ridge. In such an embodiment the second conical section of the inner surface comprises a beveled edge in a portion of the seal ring. The ridge, in this embodiment, does not mechanically engage any portion of the retainer trough, to secure the seal ring therein.

Preferably the seal ring is nested within the retainer trough without securement therein by adhesives or any mechanical means. In this manner, the seal ring can be nested by hand, and removed by hand, as may be desired. For example, after repeated insertions and extractions of the second conduit member tubular section within the seal ring, it may be desirable to replace the seal ring to ensure maintenance of a good seal.

In preferred embodiments the seal ring comprises elastomeric foam material. Preferably it is a material such as urethane. It may be constructed by free rise urethane molding techniques.

In certain preferred embodiments the seal ring is sized and configured to compress at least about 10%, in cross-dimension, along at least a portion thereof, when the second conduit member tubular section is inserted through the seal ring central aperture, during formation of the radial seal. Preferably it compresses the most in a portion furthest from a point of initial insertion of the second conduit member tubular section into the seal ring, during formation of the seal; i.e. at a location near the second end wall.

In certain preferred embodiments the first conduit member comprises an air intake conduit for a ventilation system; and, the second conduit member comprises a portion of a joint or extension between the first conduit member and an air filter assembly. In preferred embodiments, the first conduit member includes an internal seat therein, sized and constructed to receive a portion of the second conduit member tubular section nested in an abutting relationship therewith, during formation of the radial seal. Preferably the second conduit member tubular section has a first inside diameter no greater than, and preferably less than, the inside diameter of the first conduit member tubular section against which it abuts, when the seal is formed.

In certain embodiments, the seal ring inner surface may include a lubricant thereon, such as silicone mold release, to facilitate assembly.

DETAILED DESCRIPTION

The present invention concerns joints between connecting conduits. It particularly concerns joints between connecting conduits in air transfer systems. An example of such system is the connection between an air cleaner housing and a clean air intake duct for a ventilation system (such as a ventilation system for a cab of a vehicle) or an intake duct for an engine or turbine. Herein, the principles of the present invention are described in an environment of an assembly for providing clean air to a ventilation system. It will be understood, however, that the principles may also be applied in other air conduit systems.

Figure 1:
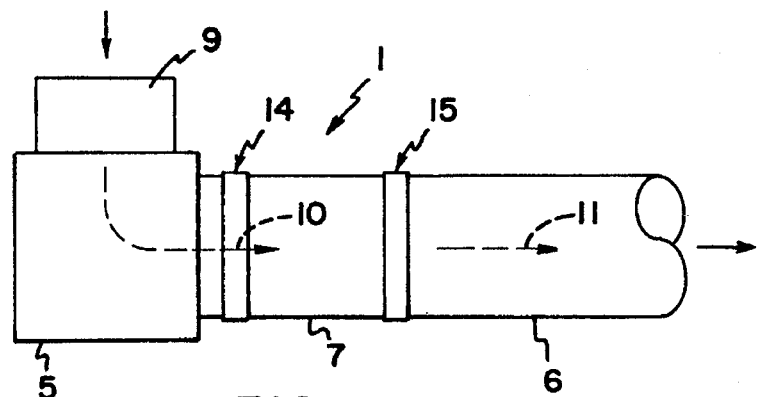
FIG. 1 is a schematic representation of an assembly comprising an air cleaner housing, clean air conduit and joint, according to the present invention.

In FIG. 1, the reference numeral 1 generally designates an arrangement comprising an embodiment in which a construction according to the present invention can be advantageously used. In particular, arrangement 1 comprises an air filter assembly 5, a clean air conduit 6 and a joint or extension 7 positioned therebetween. Clean air conduit 6 may, for example, comprise an air intake conduit for a ventilation system.

Referring to FIG. 1, operation of arrangement 1 is generally as follows: first, air enters air filter assembly 5 at inlet 9. The air passes through a filter (not shown) within air filter assembly 5, and the clean air passes outwardly from air filter assembly 5 as indicated generally at arrow 10. Eventually, the air is directed into conduit 6 and further into the ventilation system, as indicated generally at arrow 11. For the arrangement 1 depicted in FIG. 1, in passing from the air filter assembly 5 to the clean air conduit 6, the air is directed through extension 7.

In the arrangement shown in FIG. 1, two sealed connections are of concern, with respect to joint or extension 7. These seals are indicated schematically at 14 and 15 respectively, although their precise location will depend on the particular system. Seal 14 is between joint 7 and air filter assembly 5, and ensures that unfiltered air does not enter joint 7 at this location. While a variety of seals may be utilized as seal 14, it is an advantage of arrangements according to the present invention that they are particularly well adapted for utilization with arrangements such as those described in U.S. Pat. No. 4,720,292, incorporated herein by reference. Further detail with respect to this, is provided hereinbelow.

Seal 15 is positioned between joint 7 and clean air conduit 6. According to the present invention, a unique seal is provided at this location, to advantage. While the principles of the present invention may be applied to a variety of connections or joints between conduits, they are particularly well adapted (as the preferred embodiments depicted show) for utilization at a seal (such as seal 15) between an air conduit 6 and an extension 7 that connects the clean air conduit 6 to an air filter assembly 5.

Figure 2:
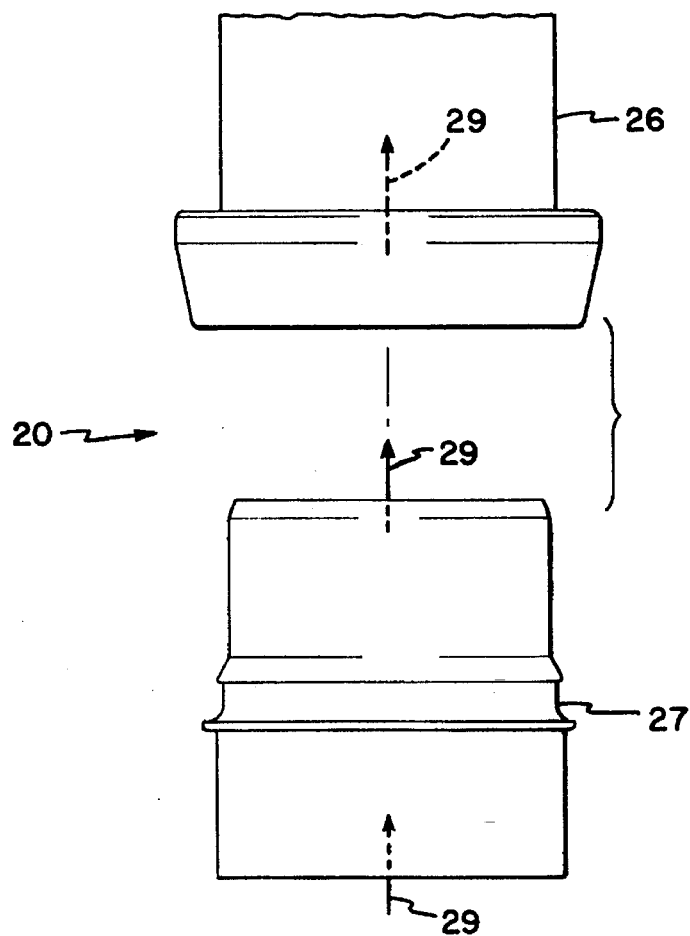
FIG. 2 is an exploded, fragmentary side elevational view of a clean air conduit and joint according to the present invention.

In FIG. 2 an exploded side elevational view is presented, of a particular assembly or construction 20, according to the general principles of arrangement 1, FIG. 1. Specifically, in FIG. 2 the region in association with a seal analogous to seal 15, FIG. 1, is depicted.

Construction 20 includes clean (first) air conduit member 26 and a second conduit member or extension 27. In general, extension 27 provides a joint or conduit, operatively connecting an air filter assembly (not shown in FIG. 2 but depicted at 25 in FIG. 4) to clean air conduit 26. By analogy to arrangement 1, FIG. 1, in operation air which has been filtered by an upstream air filter, passes through extension 27 into clean air conduit 26, as shown at arrows 29.

Figure 4:
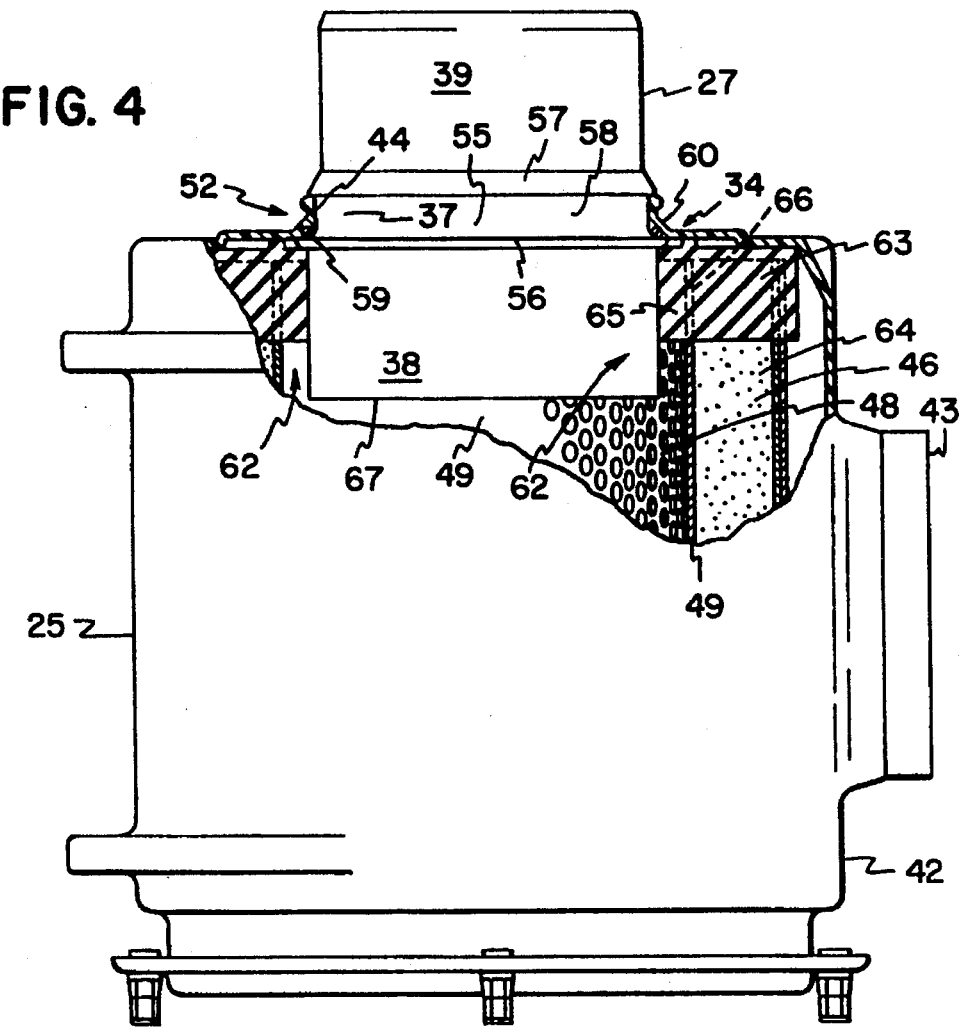
FIG. 4 is a side elevational view of an air cleaner assembly including an outlet member therein with portions broken away to show internal detail; the assembly being depicted with a connector that can be used to form a joint according to the present invention.

A seal 34, FIG. 4, analogous to seal 14, will be used at the connection between extension 27 and the air filter assembly, to protect against leakage of unfiltered air into extension 27. For the arrangement shown in FIG. 4, the seal is according to that described in U.S. Pat. No. 4,720,292, referenced above. Again, further detail with respect to this is provided in connection with FIGS. 4 and 5.

Figure 8:
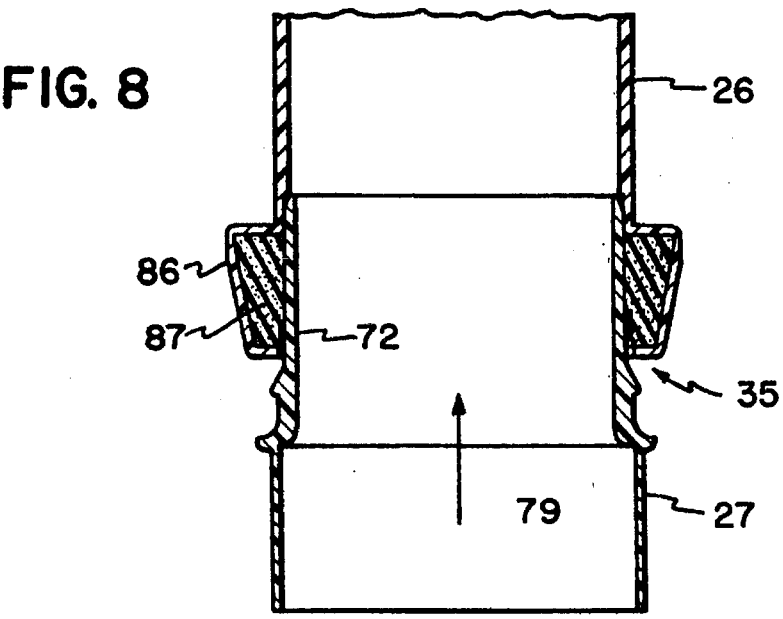
FIG. 8 is a cross-sectional view of the components of FIG. 2, With the two components shown fully engaged.

By analogy to seal 15, a second seal 35, FIG. 8, is provided at the connection between extension 27 and clean air conduit 26. This seal is a radial seal advantageously created according to the principles of the present invention.

Figure 3:
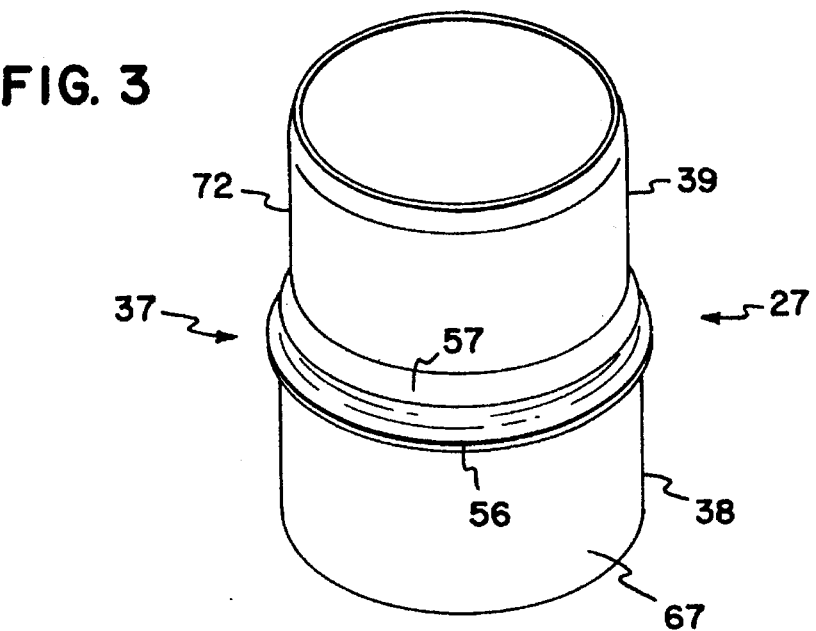
FIG. 3 is an enlarged perspective view of a component depicted in FIG. 2.

Attention is now directed to FIG. 3. In FIG. 3 extension 27 is depicted in perspective. From a review of FIG. 3, and the descriptions provided herein, it will be understood that extension 27 includes features relating to three basic functions: mechanical connection to air filter assembly 25 (FIG. 4); sealing engagement with an air filter positioned within air filter assembly 25 (FIG. 4); and, sealing engagement with clean air conduit 26. These features are generally respectively illustrated in the regions designated 37, 38 and 39.

Figure 5:
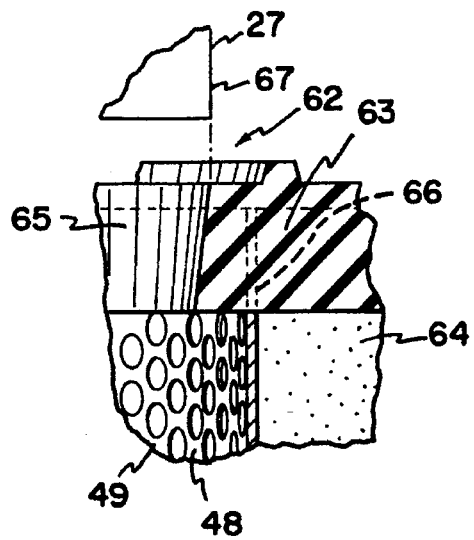
FIG. 5 is an enlarged, exploded, fragmentary cross-sectional view of a portion of the arrangement shown in FIG. 4.

Features in regions 37 and 38, relating to mechanical connection to air filter assembly 25, FIG. 4, and a sealing engagement with an air filter positioned therein, will generally be understood by reference to FIGS. 4 and 5. Referring first to FIG. 4, air filter assembly 25 comprises housing 42 having inlet 43 and outlet 44. Positioned within housing 42 is air filter 46. Air filter 46 is a cylindrical member defining an internal clean air chamber 48. Chamber 48 is lined by perforated liner 49. In use, air enters housing 42 through inlet 43. It then passes through air filter 46 and into chamber 48. The air then exits housing 42 through outlet 44.

A mechanical engagement between housing 42 and extension 27 is indicated generally at region 52. In particular, extension 27 includes, on an outer surface 55 thereof, bead 56 and shoulder 57.

Housing 25 includes extension 60 thereon sized for a snap fitting engagement with extension 27, in particular against surface 58 between bead 56 and shoulder 57. To facilitate the snap fit, for example, both housing 42 and extension 27 may be constructed from a plastic polymeric material such as nylon or polypropylene. Also, an O-ring 59 may be used. It will be understood that in region 52 there is no requirement for an air seal. Indeed the connection may be sufficiently loose to allow for some relative rotation between extension 27 and housing 42, especially in the absence of air filter 46.

From the above descriptions, it will be apparent that the engagement between extension 60 and outer surface 58 of extension 27, generally corresponds to the features discussed above with respect to region 37, FIG. 3.

A seal is provided to ensure that unfiltered air does not enter extension 27. The seal is indicated, in FIG. 4, generally at 62. Seal 62 is a radial seal as described in U.S. Pat. No. 4,720,292. In particular, air filter 46 includes end cap 63 positioned on filter element 64. Region 65 of end cap 63 is compressible, and overlaps a portion 66 of liner 49. In general, region 65 defines an aperture in end cap 63 of a smallest diameter slightly smaller than the outside diameter of section 67, FIG. 3, of extension 27. However, the diameter of aperture 67 in region 65 is large enough so that end cap 63 can be fit over section 67, snugly, with some compression in region 65 of end cap 63. A result of such a fitting, is that region 65 is compressed against liner 49, and a radial seal is formed between region 65 and section 67 of extension 27. As described in U.S. Pat. No. 4,720,292, preferably region 65 comprises a compressible elastomeric foam material, such as a urethane foam. Indeed, in preferred embodiments the entire end cap 63 will comprise such material.

Attention is directed to FIG. 5, which illustrates structure in the vicinity of seal 62 in more detail. In FIG. 5, extension 27 is shown not inserted in end cap 63. It will be understood that upon insertion of region 67 into region 65, region 65 will compress and radial seal 62 will form.

As indicated above, the present invention concerns provision of a unique seal or joint between two tubular air conduit members in an air conduit system. For the arrangement shown in FIG. 2, this is specifically a junction between extension 27 and clean air conduit 26. Details of the preferred arrangement according to the present invention are reflected in FIGS. 6–9.

Figure 6:
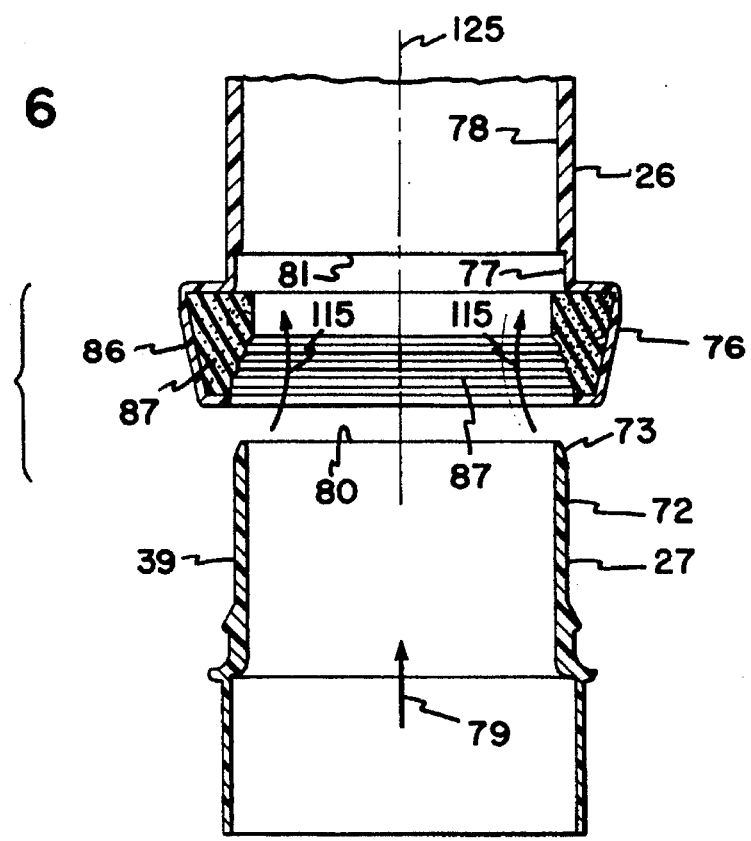
FIG. 6 is an enlarged, exploded, fragmentary cross-sectional view of the two components shown in FIG. 2.
Figure 7:
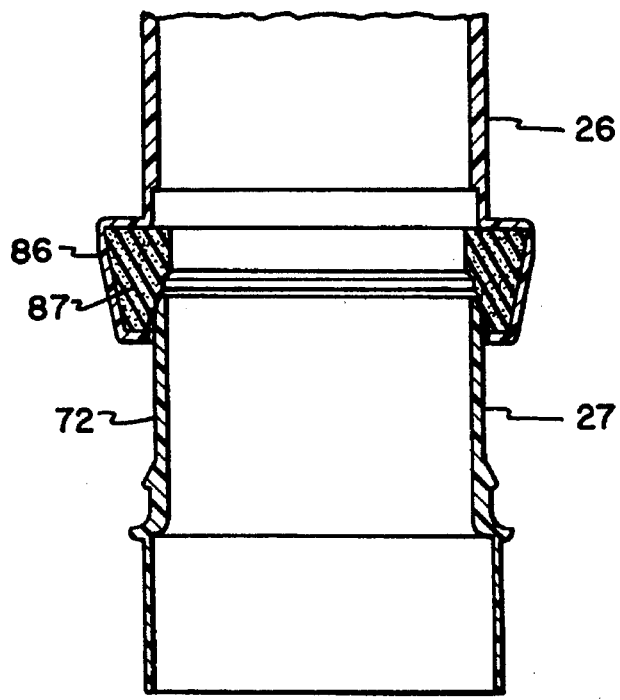
FIG. 7 is a cross-sectional according to view FIG. 6, with the two components depicted partially engaged.

In FIGS. 6–8, cross-sectional views of the extension 27 and clean air conduit 26 are presented. In FIG. 6, an "exploded" view is shown. Thus, conduit 26 and extension 27 appear as they would prior to being joined.

The portion of extension 27 which is involved in the engagement with clean air conduit 26 is cylindrical tubular section 72. Tubular section 72 comprises a portion of region 39, FIG. 3. Section 72 includes beveled end or outside edge 73 thereon, FIG. 6. End 73 comprises the most forward portion of tubular section 72, i.e. the portion first inserted into clean air conduit 26 during assembly.

Clean air conduit 26, FIG. 6, generally includes: a seal retainer 76; seat 77; and, flow passageway 78. When extension 27 and clean air conduit 26 are assembled to form a radial seal therebetween, cylindrical tubular section 72 is inserted sufficiently far into conduit 26 such that end portion 80 of tubular section 72 is positioned on seat 77 with beveled end or edge 73 oriented adjacent shoulder 81; that is, tubular section 72 abuts a portion of the tubular section of conduit 26 defined by seat 77. Preferably shoulder 81 is sized such that when tubular section 72 is positioned within seat 77, no significant abutment to air flow is presented. That is, preferably the inside diameter of flow passageway 78 is about the same as (or is a little larger than) the inside diameter of tubular section 72, for flow in the direction of arrow 79. This is illustrated in FIG. 8. Alternately stated, preferably passageway or tubular section 78 has an inside diameter no smaller than an inside diameter of the abutting portion 72 of conduit member 27.

Referring again to FIG. 6, seal retainer 76 on clean air conduit 26 comprises retainer trough 86 with flexible seal ring 87 positioned therein. The seal ring 87 is formed from a sufficiently flexible, compressible material, so that it can be manually deformed for being positioned in, or removed from, trough 86, FIG. 9. The seal ring 87 should also be sufficiently compressible to form a good seal against tubular section 72, when the tubular section 72 is inserted therein, FIG. 8.

In general, the function of the retainer trough 86 is to securely retain the seal ring 87 in position, for generation of a seal upon insertion of the cylindrical tubular section 72 of the extension 27 therein. The seal ring 87 is sized and shaped to provide for advantageous operation.

Figure 10:
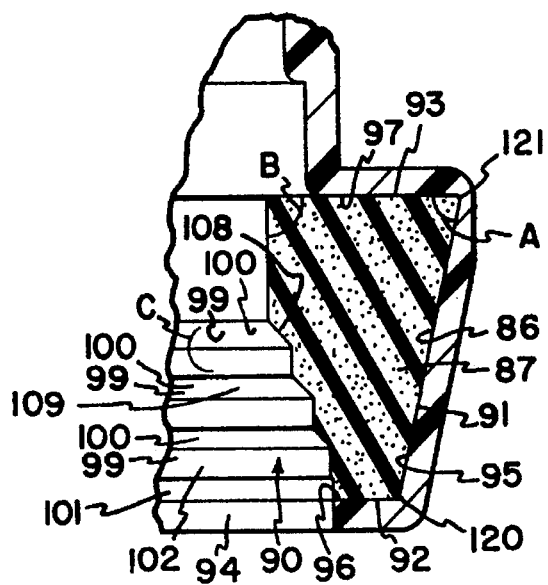
FIG. 10 is an enlarged, fragmentary, cross-sectional view of a portion of the component depicted in FIG. 6.

In FIG. 6, seal ring 87 is viewed partly in cross-section. An enlarged view is presented in FIG. 10. Referring to FIG. 10, ring 87 is circular or annular and has four sides or walls designated at 90, 91, 92 and 93 respectively. Side 90 is an inner surface or side of seal ring 87 which defines an aperture 94 through which tubular section 72 is inserted, to form a seal during sealing, FIG. 8. Side 91 and end walls 92 and 93 are sized and shaped to engage various walls 95, 96 and 97 respectively in retainer trough 86.

Herein reference numeral 91 is used to refer to a side (outside wall) generally opposite the side 90 engaged by section 72; numeral 92 is used to identify a front end wall of ring 87, by "front" in this context it is meant the wall oriented toward extension 27 as extension 27 is inserted into conduit 26; and, side 93 is the back end wall or back opposite side 92, and comprises the wall toward which axial pressure is directed, during a step of inserting tubular section 72 through seal ring 87. The size, shape and direction of extension of each side or wall in the preferred embodiments shown, is of some significance with respect to the sealing operation, as will be understood from further description.

Side 90 is generally stepped, as indicated at steps 99 to decrease in diameter from the front end wall 92, to the back end wall 93. This presents, to tubular section 72, a seal ring of decreasing diameter in a step wise fashion, as section 72 is further inserted into seal ring 87; see FIGS. 6, 7, 8 and 10. Preferably side 90 includes at least one step, more preferably at least three steps. Each step 99, FIG. 10, comprises a slanted back wall 100, to facilitate the insertion. It is noted that the internal diameter of seal ring 87 in the region of the first several steps (101, 102) through which section 72 passes during sealing are of a diameter about the same size as, or slightly larger than, an outside diameter of end portion 80 of tubular section 72, FIG. 6. Further, the last several steps 108 and 109 are of an inside diameter substantially smaller than an outside diameter of end portion of tubular section 72. A gradation results, in the steps from wall 92 to wall 93, along side 90. Thus, as tubular section 72 is inserted into seal ring 87, the seal ring 87 will be compressed substantially in the regions of steps 108 and 109, but less so in the regions of steps 101 and 102. Indeed, there is a gradation of compression occurring, with gradation increasing from wall 92 to wall 93. A gradation resulting in decrease in diameter (of the inside surface 90 of ring 87) on the order of about 5% to 10% from front wall 92 to back wall 93 will be preferred for typical applications with a tube 72 of diameter about 3 cm to 25 cm. Preferably seal ring 87 is configured to compress at least 10%, in cross-sectional dimension, in the region nearest back wall 93, (i.e. near step 108) during formation of the radial seal.

Tapering of the seal from a thin seal member to a thick seal member in the general direction of front wall 92 to rear wall 93 provides advantage. Where greater compression in the seal ring 87 occurs, a better seal results. Thus, during insertion, as member 72 is inserted through ring 87, compression is enhanced and a relatively strong seal is provided. If the entire ring 87 were as thick as the thickest portion, it would be much harder to insert member 72 therein. If the ring were of even thickness, somewhere between the thickness of end 92 and thickness of end 93, the seal ring 87 would tend to bunch or roll, during insertion.

It will also be understood that side 90 could be provided smooth, rather than stepped, indeed in some embodiments this may be desired. However, in general the stepped gradations would be preferred, for numerous reasons. For example, the steps result in rings or ribs in the seal, FIG. 8, which provide individual pressure points or concentrated pressure rings around the seal. This will tend to operate like multiple seals aligned axially with respect to one another. This helps avoid dust or other material working to cause a failure along the seal, during wiggling of components or vibration of the equipment. It will also be easier to insert member 72, without rolling or bunching, if a stepped wall 90 is used.

In some embodiments, surface 90 of seal ring 87, and indeed the entire seal ring 87 if desired, may be coated with a lubricant to facilitate insertion of section 72. A preferred lubricant for such a purpose is silicone mold release. Indeed, in some instances section 72 may also be coated with a such a lubricant to facilitate insertion.

In general, for preferred applications seal ring 87 will not be secured within retainer trough 86 by means such as an adhesive or the like. Rather, seal ring 87 is removeable and replaceable (i.e. it is free to be placed into and removed from retainer trough 86 by hand). Thus, seal ring 87 can be readily and easily changed, should it become worn through multiple use or cycling, i.e. as tubular section 72 is repeatedly inserted into seal ring 87 and withdrawn therefrom while maintenance operations and the like are conducted.

A potential problem to utilizing a flexible seal member such as seal ring 87 under conditions wherein it is not anchored to, adhered to, or otherwise secured to the retainer trough 86, could have been a problem of the seal ring bunching up or even rolling (for example in the direction indicated by arrows 115, FIG. 6) during insertion of section 72 into seal ring 87. Such bunching or rolling, should it have occurred, would have potentially led to an imperfect and undesirable air seal, as well as possible generation of too much resistance to insertion of section 72 into seal ring 87, to conveniently form the air seal.

Retainer trough 86 and seal ring 87 are sized and configured to specifically inhibit or at least resist such a rolling as that described in the previous paragraph. One feature which facilitates this is the shape and direction of wall 91.

Figure 9:
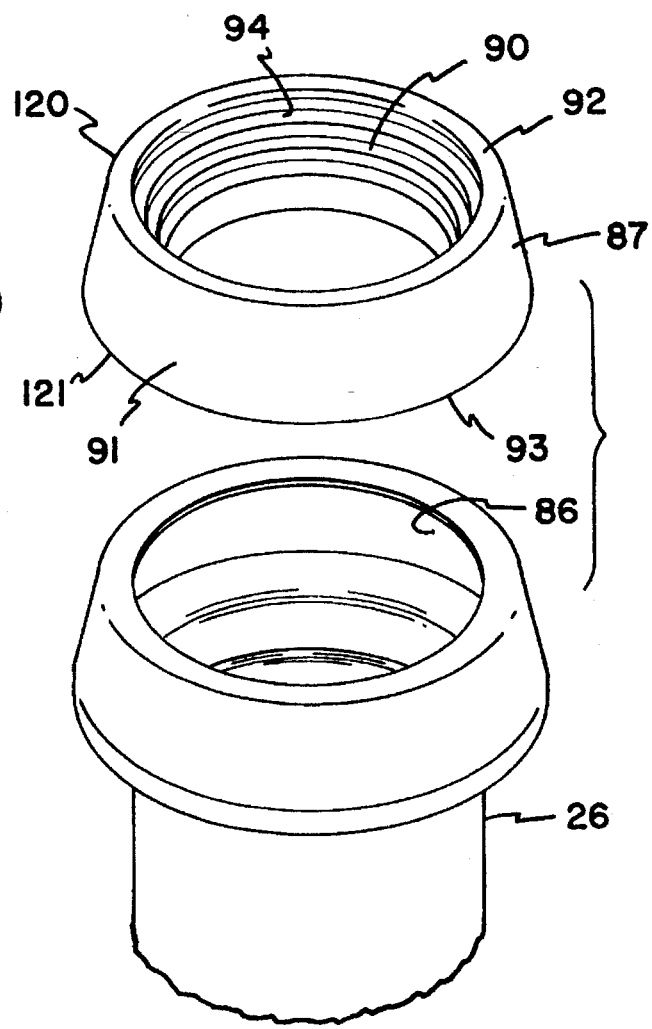
FIG. 9 is an exploded perspective view of a component of the assembly depicted in FIGS. 2 and 6–8.

Referring to FIGS. 9 and 10, side wall 91 is frustoconical. In particular, the outside diameter at front edge 120 is smaller than the outside diameter at rear edge 121. In this context "front" is meant to refer to the edge or end first passed during insertion of extension 27 into conduit 26; and, "rear" is meant to refer to the edge or end passed second. It will be understood that retainer trough 86 is shaped accordingly. Such a shape to side wall 91, in cooperation with broad backwall 93, inhibits bunching or rolling of the seal ring 87, as tubular section 72 is inserted therein. Preferred dimensions with respect to this are provided hereinbelow. In general, the outside diameter of rear edge 121 should preferably be about 25% larger than the outside diameter of front edge 121, for preferred embodiments used with tubes 72 on the order of 3 cm to 25 cm in diameter. Also, preferably side wall 91 is smooth. That is, it contains no fingers, lips or ribs thereon, for hooking engagement with any portion of retainer trough 86.

In the preferred embodiment described and shown, end walls 92 and 93 are parallel to one another and each is a smooth surface (free of portions which mechanically engage any part of trough 86) which extends substantially perpendicular to a central longitudinal axis 125 (FIG. 6) of clean air conduit 26 or cylindrical tubular section 72. Such an orientation for back wall 93 provides that as section 72 is inserted into seal ring 87, wall 93 is pressed against wall 97 (FIG. 10) without significant bunching or rolling. Such an orientation for front wall 92 generally means that as tubular section 72 is withdrawn from seal ring 87 compression occurs against front wall 96 with relatively little bunching or rolling. Both operations are preferred, in a system wherein multiple insertions and withdrawals (recycling) of extension 27 with respect clean air conduit 26 are foreseen.

It is noted that in the preferred embodiment depicted, no portion of the seal ring 87 is hooked over, or is mechanically engaged by, any features in trough 86. Rather, seal ring 87 is merely nested within retainer trough 86, with walls (95, 96, 97) of the retainer trough 86 positioned along and around at least three sides of the seal ring 87. This facilitates molding of seal ring 87 and engagement between seal ring and retainer trough 86. It is an advantage of the present invention that the design allows for both retainer trough 86 and seal ring 87 to be formed without features for mechanical connection or engagement with the other.

An Example of Preferred Materials and Dimensions

While it is foreseen that a variety of materials may be utilized in arrangements according to the present invention, preferred materials have been identified for applications such as to direct engine and/or ventilation intake air. In addition, while it is foreseen that the principles of the present invention may be applied in systems of a variety of specific size and shapes and dimensions, certain preferred relative dimensions and shapes have been developed, for specific applications as part of a ventilation system in an agricultural vehicle cab. The general principles and applicability of the present invention will be better understood from consideration of a specific system with respect to a preferred embodiment.

Consider a system comprising an air flow stream into a ventilation system for an agricultural vehicle cab. It is foreseen that typical air flow rates for such a system will be on the order of about 50–150 cubic feet/minute (cfm).

In general, the air intake conduit (downstream from the filter element) for such a system will be on the order of 8–9 cm, outside diameter. If the sections of the air flow conduits are molded from nylon or polypropylene plastic, it will generally have a thickness on the order of about 0.15 cm to 0.30 cm. Such a conduit section, for the system described, will generally correspond to clean air conduit 26, FIG. 2; and, portions of joint 27.

It is foreseen that a usable air cleaner assembly for such a system would be a cylindrical, pleated paper filter assembly, including as a filter element a radial seal element, available from Donaldson Company, Bloomington, Minn. 55440. Such a system is readily able to filter air within the flow rates identified.

The outlet aperture for such a filter element would be on the order of 8–9 cm tapering at about a 0.5 degree taper to a smaller inside diameter, FIG. 5.

For the arrangement described, it is foreseen that the opposite end of extension 27, i.e. end 72, FIG. 6 would have an inside diameter of about 9.1 cm and an outside diameter of about 9.5 cm. Beveled edge 73 would be at a radius of about 0.48 cm.

To provide a good seal, the seal ring 87 in such a system would be sized and shaped as follows: angle A (FIG. 10) about 10°; angle B, FIG. 10, 90°; angle C, FIG. 10, 30°; length of wall 91, 1.25 cm to 3.81 cm; length of wall 92, 0.63 cm to 0.97 cm; and length of wall 93, 1.25 cm to 1.57 cm. On surface 90, in going from the largest diameter to the smallest, the depth of each step is about 0.16 cm. Height of each step on surface 90 going from largest to smallest internal diameter: 0.39 cm; 0.47 cm; and 1.25 cm.

Preferably, the seal ring comprises a free rise urethane foam. More specifically 13.7 pound density and compression set at 180° F. (82° C.): 25% maximum average at 50% deflection after aging at 22 hours at 180°±1.8° F. (82±1° C.) and allowing a 30 minute recovery.

Retainer trough 86 can be molded from nylon polypropylene directly as part of conduit 26. The dimensions of trough 86 would merely need to be sufficient to retain ring 87. Preferably wall 97 of retainer trough 86 has a width at least 0.36 cm shorter than the distance across wall 93 of seal ring 87. This is illustrated in FIG. 10. Thus, in the vicinity of wall 97, seal ring 86 will compress at least about 10 percent as tubular section 72 is inserted therethrough.

Alternate Cross-Section for Seal Ring

Figure 11:
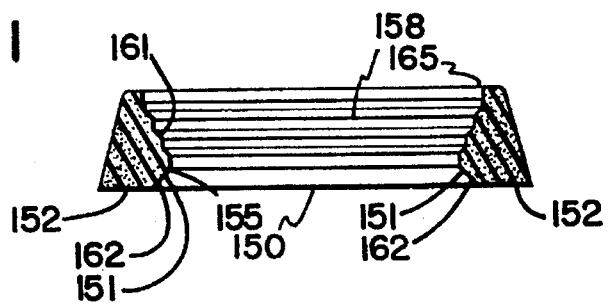
FIG. 11 is a cross-sectional view of an alternate seal ring, to a seal ring depicted in FIG. 9, usable in arrangements according to the present invention.

Attention is now directed to FIG. 11, wherein an alternate seal ring 150 is depicted in cross-section. Seal ring 150 is generally sized and shaped the same as seal ring 87, FIGS. 6–10, except for the presence of bevel surface 151 between back wall 152 and seal surface 158. The position of a bevel surface such as surface 151 at this location even more greatly allows for resistance to bunching or roll during insertion of cylindrical tubular section 72 into the seal ring 150, while at the same time allowing for less compression of material (since less material is present, and thus less resistance to insertion). Thus, bevel surface 151 provides for a system which is easier to assemble, since less resistance to insertion of the tubular section 72 into the seal ring 150 is provided, relative to insertion into the seal ring 87, while at the same time allowing for inhibition of rolling of seal ring 150 analogously to the rolling indicated in FIG. 6 at arrows 115.

Typically provision in a seal ring with a bevel surface analogous to bevel surface 151 on the order of 0.3 cm across, FIG. 11, will be sufficient to provide advantage. Generally, distances on the order 0.12 to 0.36 cm will be utilized.

In general, bevel surface 151 should be provided at an angle relative to the general extension of wall 158 on the order of about 45°. Surface 151 may be generally frusto-conical and flat.

An alternate manner of describing the seal ring for the embodiment of FIG. 11 is as follows. The inner surface 158 of the seal ring 150 has a first conical section 161 and a second conical section 162 (comprising surface 151), with ridge 155 positioned therebetween. The first conical section has a decreasing inside diameter in extension from the first edge in extension along a direction from front end wall 165, to the ridge 155; and, the second conical section 162 has a decreasing inside diameter in extension from the second end wall 152 toward the ridge 155. Preferably section 151 is smooth and free of ribs, ridges, fingers, hooks or other constructions thereon.

Alternate Positioning of the Retaining Trough

For the arrangements shown in FIGS. 6 through 10, the retaining trough 86 is shown positioned on the clean air conduit, and the cylindrical tubular section 72 to be inserted into the seal ring 87 comprises a section of the extension 27 which also forms a seal with the air filter 46. In some embodiments, alternate positioning is available. More specifically the principles of the present invention may be applied to form an appropriate or desirable seal and joint when the retainer trough is positioned on the extension 27, and the tubular section 72 (to be inserted into the seal ring) is positioned on the clean air conduit.

It is further noted that the principles of the present invention have been defined as applied in connection with an extension of tubing, such as extension 27, which forms both a seal with an air filter and with a second conduit. The principles may be applied when joining any of a variety of air conduits, regardless of connections at opposite ends of those conduits. Thus, the principles may be applied to join two air conduits neither one of which is also joined to an air filter or air filter assembly. Of course it follows that the principles may be applied when even though one of the tubular members is sealingly connected to an air filter, it is not connected by means of a radial seal such as that depicted in FIG. 4.

However, from a view of the figures in the detailed description presented hereinabove, it will be understood that the principles of the present invention are uniquely adapted for advantageous operation wherein a seal such as that illustrated in FIGS. 4 and 5 and described in U.S. Pat. No. 4,720,292 is utilized, with an air filter. When such an arrangement is utilized, relatively lightweight materials may be utilized for all components, and thus molded plastics such as nylon and polypropylene may be utilized. Further, complete assembly by hand, without operation of threaded arrangements, bolts, clamps and the like, as possible. Alignment is relatively easy, and engagement of parts can be made without the need for tools and under pressures readily achieved (by hand) by most workers in the field.

It will be understood that the specific components, arrangements and methods described herein are not be interpreted as limiting, except as required by the following claims. The principles of the present invention may be applied in a variety of specific manners other than those recited.

What is claimed is:

1. An assembly for providing a radial seal between two air conduit members; said assembly comprising:
   (a) a first conduit member having an open end including a seal retainer thereon; said seal retainer including a retainer trough;
      (i) said retainer trough having at least three sidewalls; said three sidewalls comprising a front wall adjacent said open end, a rear wall and a frusto-conical sidewall extending therebetween; said frusto-conical sidewall increasing in diameter from said front wall to said rear wall (b) a compressible seal ring operably positioned within said retainer trough; said seal ring, when in an uncompressed state, comprising elastomeric material and having:
  (i) first, second and third outside walls including first and second opposite end walls; said first wall engaging said front wall, said second wall engaging said rear wall and said third wall engaging said frustoconical sidewall;
  (ii) an inner surface defining a central aperture therethrough; said seal ring inner surface being stepped, in decreasing diameter, in a direction of extension from said first end wall to said second end wall;
  (iii) said seal ring third outside wall being opposite said seal ring inner surface and having a frusto-conical configuration of increasing outside diameter in a direction of extension from said first end wall to said second end wall;
  (iv) said seal ring being sized to fit between said trough front and rear walls, in use.
(c) a second conduit member having a tubular section constructed and arranged for insertion through said open end and through said seal ring central aperture when said seal ring is nested within said retainer trough; said tubular section being sized to cause compression of said seal ring sufficiently for formation of a radial seal with said seal ring inner surface, when said second conduit tubular section is inserted through said seal ring central aperture;
  (i) said retainer trough being sized to receive said compressible seal ring without compression of said seal ring in a direction between said seal ring inner surface and said seal ring outside wall, before said second conduit member is operably inserted into said seal ring central aperture.

2. An assembly according to claim 1 wherein:
(a) said first end wall of said seal ring is substantially parallel to said second end wall of said seal ring.

3. An assembly according to claim 2 wherein:
(a) said seal ring inner surface includes a beveled edge directed to intersect one of said end walls.

4. An assembly according to claim 1 wherein:
(a) said seal ring inner surface includes a beveled edge directed to intersect one of said end walls.

5. An assembly according to claim 1 wherein:
(a) said seal ring is non-adhesively secured within said retainer trough; and,
(b) said seal ring is non-mechanically connected to said retainer trough.

6. An assembly according to claim 1 wherein:
(a) said seal ring comprises a urethane foam material.

7. An assembly according to claim 1 wherein:
(a) said second conduit member tubular section has a smooth outer tubular surface, where it engages said seal ring inner surface, in use.

8. An assembly according to claim 1 wherein:
(a) said seal ring is sized and configured to compress at least about 10%, in cross-sectional dimension, along at least a portion thereof, when said second conduit member tubular section is inserted through said seal ring central aperture, during formation of the radial seal.

9. An assembly according to claim 1 wherein:
(a) said first conduit member comprises an air intake conduit for a ventilation system; and,
(b) said second conduit member comprises a joint extension between said first conduit member and an air filter.

10. An assembly according to claim 1 wherein:
(a) said first conduit member includes an internal seat; and,
(b) said second conduit member tubular section is sized and configured to engage said internal seat, when said tubular section is inserted through said seal ring central aperture to form the radial seal.

11. An assembly according to claim 1 wherein:
(a) said second conduit member tubular section has a first inside diameter; and,
(b) said first conduit member has a tubular section with a second inside diameter; said second inside diameter being no smaller than said first inside diameter;
  (i) said second conduit member tubular section being constructed and arranged to abut said first conduit member tubular section, when said second conduit member tubular section is inserted through said seal ring central aperture to form the radial seal.

12. An assembly according to claim 1 wherein:
(a) said seal ring inner surface includes a silicone mold release thereon.

* * * * *